United States Patent [19]
Horiuchi

[11] Patent Number: 5,627,916
[45] Date of Patent: May 6, 1997

[54] IMAGE PROCESSING METHOD AND APPARATUS

[75] Inventor: Izuru Horiuchi, Machida, Japan

[73] Assignee: Canon Kabushiki Kaisah, Tokyo, Japan

[21] Appl. No.: 353,994

[22] Filed: Dec. 6, 1994

Related U.S. Application Data

[63] Continuation of Ser. No. 996,648, Dec. 24, 1992, abandoned.

[30] Foreign Application Priority Data

Jan. 6, 1992 [JP] Japan ..................... 4-000106

[51] Int. Cl.⁶ .................. G06K 9/36; G06K 9/46
[52] U.S. Cl. ............... 382/239; 382/248; 382/250; 382/166
[58] Field of Search .................. 382/56, 43, 49, 382/17, 166, 239, 248, 250, 251, 232, 191, 280, 302; 348/404, 405, 391, 396

[56] References Cited

U.S. PATENT DOCUMENTS

| | | | |
|---|---|---|---|
| 3,971,065 | 7/1976 | Bayer | 358/44 |
| 4,974,078 | 11/1990 | Tsai | 358/44 |
| 5,034,804 | 7/1991 | Sasaki et al. | 358/41 |
| 5,119,180 | 6/1992 | Okamoto | 358/43 |
| 5,126,857 | 6/1992 | Watanabe et al. | 358/433 |
| 5,157,488 | 10/1992 | Pennebaker | 348/405 |
| 5,218,650 | 6/1993 | Blonstein et al. | 382/17 |

FOREIGN PATENT DOCUMENTS 1-154696  6/1989  Japan .............. H04N 11/04

Primary Examiner—Leo Boudreau
Assistant Examiner—Phuoc Tran
Attorney, Agent, or Firm—Fitzpatrick, Cella, Harper & Scinto

[57] ABSTRACT

An image processing system in which image data is generated in an offset sampled structure using a two-dimensional sensor. The generated image data is separated into a plurality of sets of image data having a lattice arrangement, and each of which has the same color. One set of the image data is coded in accordance with a first coding parameter, and another set of the image data is coded in accordance with a second coding parameter. The two sets of coded data are then stored in a memory for subsequent transfer to an image output device.

15 Claims, 7 Drawing Sheets

LATTICE ARRANGEMENT

LATTICE ARRANGEMENT

OFFSET SAMPLED STRUCTURE

IMAGE PROCESSING METHOD AND APPARATUS

This application is a continuation of application Ser. No. 07/996,648 filed Dec. 24, 1992, now abandoned.

BACKGROUND OF THE INVENTION

This invention relates to an image processing method and apparatus and, more particularly, to an image processing method and apparatus which performs digital image processing using a digital camera and digital video cassette recorder.

The ADCT method (Adaptive Discrete Cosine Transform method) is well known as a data compression method for an image processing, and apparatus which balances the compression ratio and image quality of an image.

The Bayer type arrangement shown in FIG. 5 is also known as a color filter arrangement for an image pickup device which provides a high resolution in horizontal and vertical directions, and an excellent sensitivity and color reproducibility.

In a conventional image processing apparatus which adopts the above ADCT method, and color filters such as in the Bayer type arrangement, a luminance signal (which is referred and as "Y" signal) to which has been subjected to an interpolation processing, is transformed to have a lattice arrangement, and then is subjected to compression processing.

In the above conventional method, the amount of Y signal data is doubled by the interpolation process and consequently there is the drawback that the time required for the compression process becomes twice as long as that of the original data.

SUMMARY OF THE INVENTION

Accordingly, it is an object of the present invention to solve the above drawback by providing an image processing method and apparatus capable of preventing an increase in the time required for compression processing by maintaining the amount of image data to be compressed to a certain amount.

According to the present invention, the foregoing object is attained by providing an image processing method comprising: an input step for inputting image data having an offset sampled structure; a separating step for separating a color component of the image data input in the input step into a plurality of types of image data, each of which has a lattice arrangement; a first coding step for quantizing one of the image data separated in the separating step in accordance with a first threshold and coding the quantized image data; and a second coding step for quantizing another image data separated in the separating step in accordance with a second threshold and coding the quantized image data.

According to the present invention, the foregoing object is attained by providing an image processing apparatus comprising: input means for inputting image data of an offset sampled structure; separating means for separating a color component of the image data input by the input means into a plurality of types of image data, each of which has a lattice arrangement; first coding means for quantizing one of the image data separated in the separating means in accordance with a first threshold and coding the quantized image data; and a second coding means for quantizing another image data separated in the separating means in accordance with a second threshold and coding the quantized image data.

Accordingly, image data of the same color having the offset sampling structure is separated into a plurality of image data. One of the separated image data is quantized at the first threshold and coded. The other separated image data is also quantized at the second threshold and coded. In this way, the image processing method and apparatus capable of reducing the time required for compression processing and simplifying quantization of the other image data is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

A digital camera and an image data compression procedure which adopt the ADCT method, and color filters of the Bayer type arrangement are described below with reference to FIGS. 6 and 7. Through the description, the reasons why an amount of data to be compressed is increased by an interpolation operation and the interpolation is necessary for the digital camera will be understood.

Figure 6:
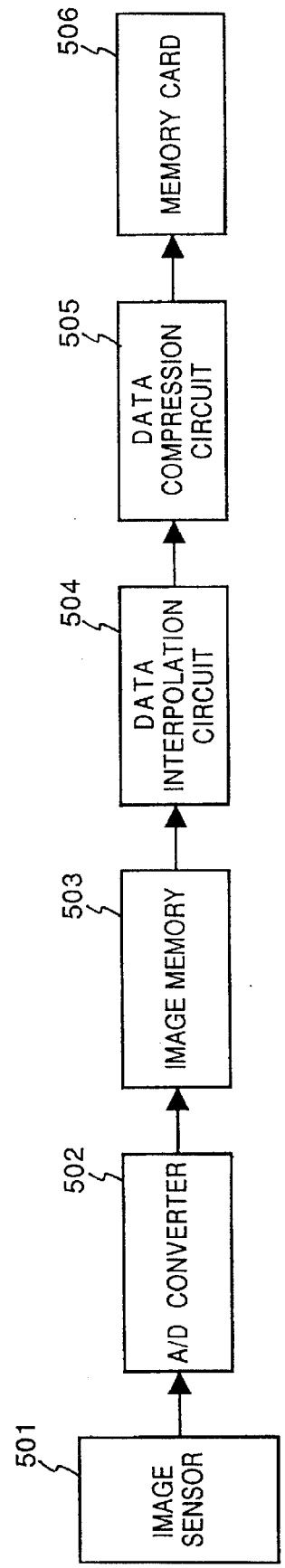
FIG. 6 is a block diagram illustrating the construction of a general digital camera.

FIG. 6 is a block diagram illustrating the construction of the digital camera.

In FIG. 6, numeral 501 is an image sensor such as a CCD area sensor, 502 is an A/D converter, 503 is an image memory, 504 is a data interpolation circuit, 505 is a data compression circuit and 506 is a memory card.

In the digital camera, image data including a Y signal which has been subjected to an interpolation processing in the data interpolation circuit 504, is transformed to a lattice arrangement, and then is compressed in the data compression circuit 505.

Figure 3:
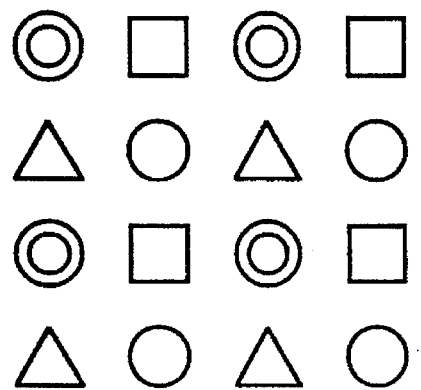
FIG. 3 is a diagram illustrating an arrangement of color filters used in the present invention.
Figure 3:
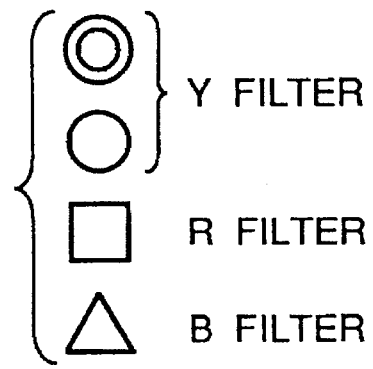
Figure 5:
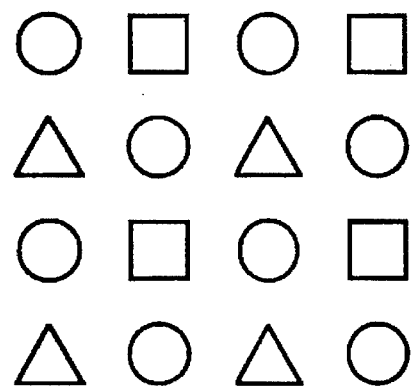
FIG. 5 is a diagram illustrating color filters used in a Bayer type arrangement.
Figure 5:
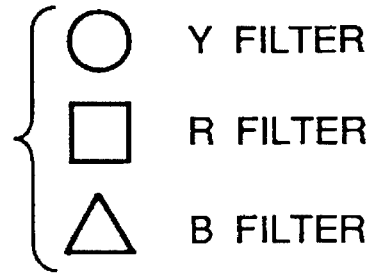

FIG. 5 illustrates an arrangement of color filters of the Bayer type. In FIG. 3, ○ denotes a Y filter which passes a luminance component (which will be referred to as a "Y" signal), □ denotes a R filter, and Δ denotes a B filter. As shown in FIG. 5, the Y filters (denoted by ○) are arranged within a 4×4 pixel block in an uneven distribution. More particularly, a Y signal occurs every two pixels. An image signal which is produced through the Bayer type color filters will be referred to as an "offset sampled image". Encoding Y signal data by using a MH coding method, for example, will exhibit less compression efficiency, since Y data occurs every two pixels. In order to maintain data compression efficiency, an interpolation process between Y pixels is necessary.

Figure 7:
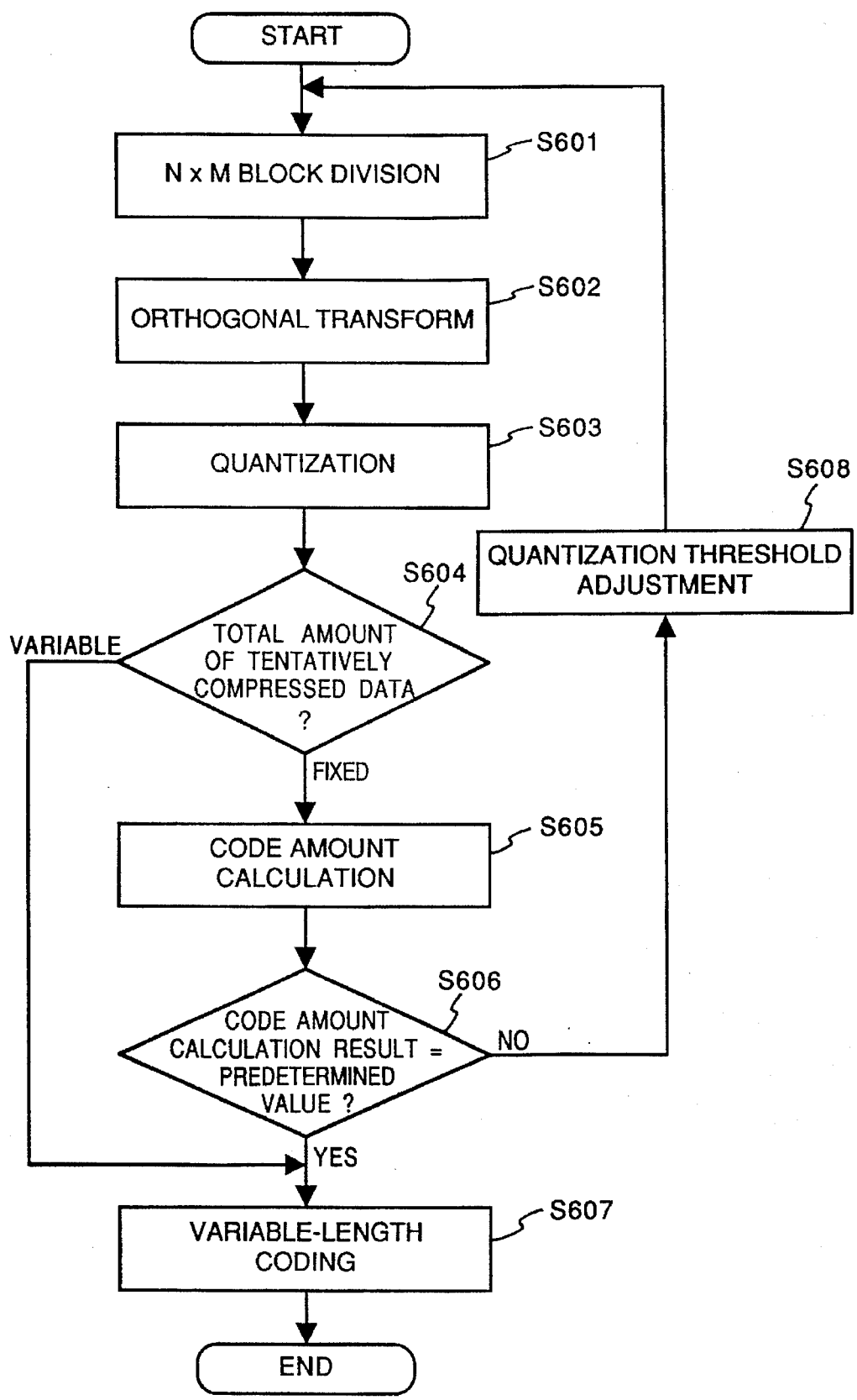
FIG. 7 is a flowchart illustrating the operation of image data compression in the digital camera of FIG. 6.

FIG. 7 is a flowchart illustrating the image data compression procedure of the digital camera.

In FIG. 7, the image data on which the interpolation process has been performed in the data interpolation circuit 504 is divided into N×M blocks at step S601.

Successively, an orthogonal transform is performed on each block of the image data at step S602 and an orthogonal transform coefficient is respectively quantized for each block at step S603 by comparing the coefficient with a quantization threshold.

After this, it is judged at step S604 whether the total amount of tentatively compressed data (data which is tentatively compressed) is variable or is fixed. The image processing apparatus adopts a variable-length encoding method. A total amount of data which has been encoded by using the variable length encoding method will vary depending on the original data. However, there are many applications of the process in which the total amount should be adjusted in a fixed amount. This is why the judgment is necessary.

If the amount is variable, the procedure proceeds to step S607 where a variable-length coding is performed on the quantized data by Huffman coding.

On the other hand, if the amount is fixed, a total amount of the encoded data is calculated at step S605. At step S606, the result of the coding amount operation is compared with a predetermined value, and if they match, the quantized data is coded by the variable-length coding at step S607. On the other hand, if they don't match, the quantization threshold is adjusted at step S608 and the process returns to step S601.

In other words, in the above-described image processing apparatus, a variable-length coding is executed after a quantization threshold has been determined which enables the apparatus to attain a predetermined amount of compressed data. That is, the amount of coded data to be compressed, is determined by altering the quantization threshold.

In the FIG. 6 apparatus, since the interpolation process doubles the data amount of the Y signal, the time required for the compression processing becomes twice as long as that for the original data.

The present embodiment eliminates the above-described drawback by means of the following construction.

Figure 1B:
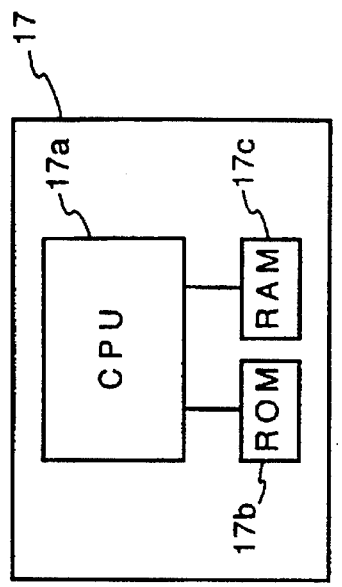
FIG. 1B is a block diagram of the data separator which is shown generally in FIG. 1A.
Figure 1A:
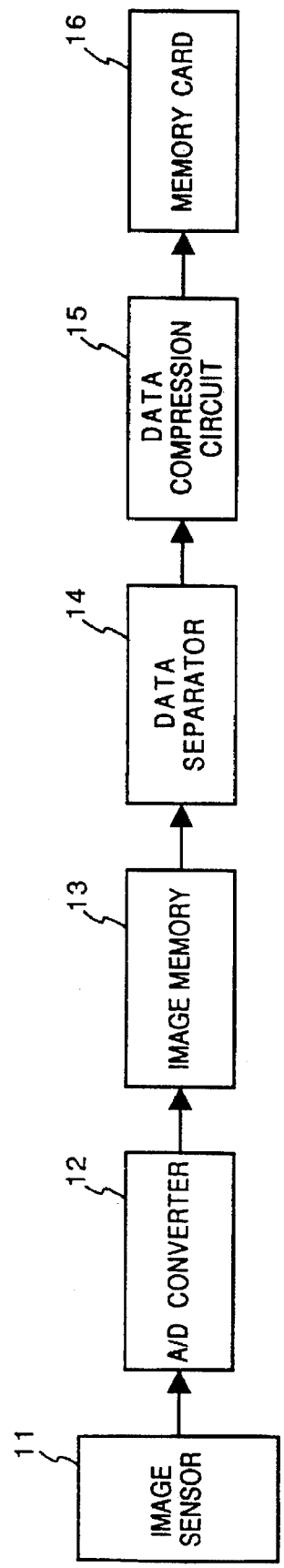
FIG. 1A is a block diagram of the image processing apparatus according to the present invention.

FIG. 1A is a block diagram illustrating the construction of a digital camera which adopts a data compression circuit of the ADCT method, and color filters of the Bayer type arrangement of the present invention.

In FIG. 1A, numeral 11 is an image sensor, 12 is an A/D converter, 13 is an image memory, 14 is a data separating circuit, 15 is a data compression circuit, and 16 is a memory card.

As apparent from FIGS. 1A and 6, the data separating circuit 14 is provided in the FIG. 1A apparatus, while the data interpolation circuit 504 is provided in the digital camera of FIG. 6.

In FIG. 1B, numeral 17 is a control unit comprising a one chip-microcomputer which functions as a data separator including a CPU 17a, a ROM 17b as program memory, and a RAM 17c as a work memory. The control unit 17 controls the overall apparatus in accordance with a control program shown in the flowchart of FIG. 2. The control program is stored in the ROM 17b.

The operation of the present embodiment is now described.

Figure 2:
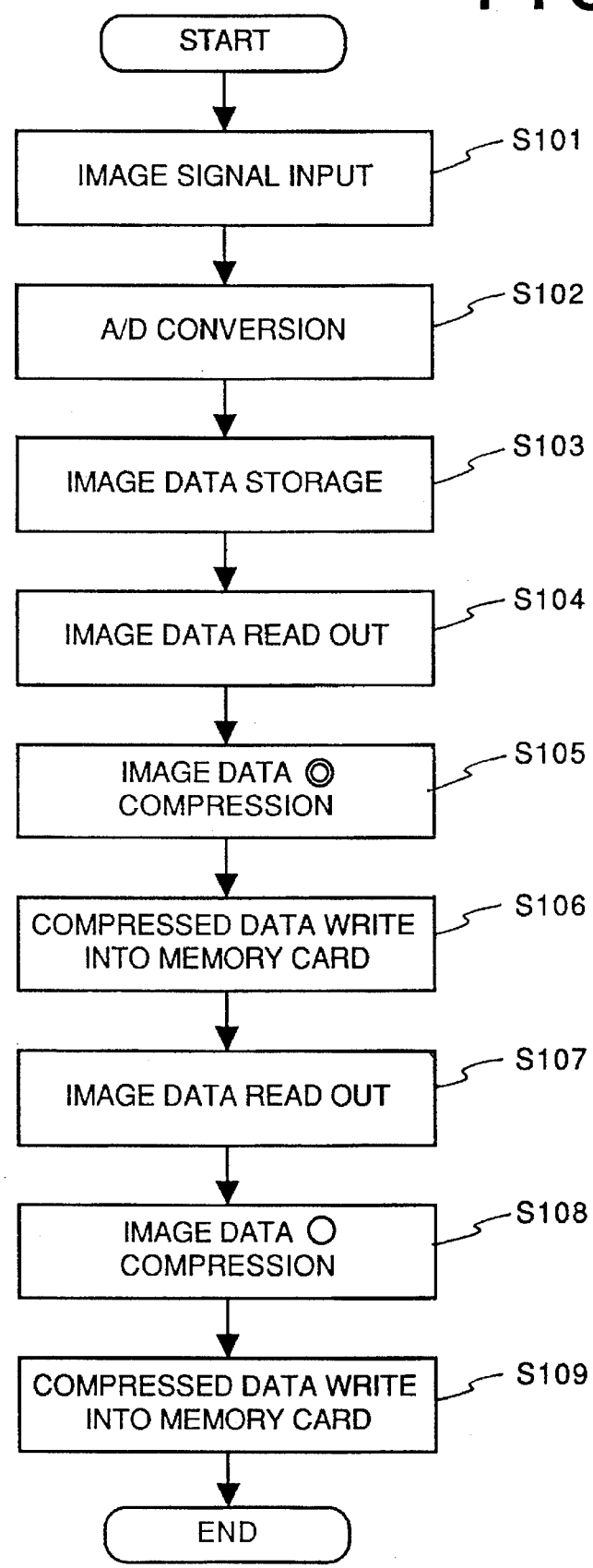
FIG. 2 is a flowchart illustrating an operation of the image processing apparatus of FIG. 1A.

FIG. 2 is a flowchart illustrating the operation of the present embodiment, and FIG. 3 is a diagram illustrating the arrangement of the color filters. The control unit 17 controls the overall processes shown in FIG. 2. Each step of FIG. 2 is respectively executed by each circuit of FIG. 1A.

In FIG. 2, an image signal is input from the image sensor 11. The image sensor 11 with the color filters of the Bayer type arrangement is driven by signals from a timing generation unit (not shown) at step S101.

At step S102, the analog image signal is converted to a digital signal by the A/D converter 12 and stored in the image memory 13 at step S103. Luminance data stored in the image memory 13 has an "offset sampled structure". Luminance data (hereinafter referred to as "Y data") with the "offset sampled structure" which is denoted by notations ⊙ and ○. At step S104, only the Y data denoted by ⊙ is read out from the image memory 13 and is output to the data compression circuit 15. This read-out operation is performed by the data separator 14.

At step S105, the compression circuit 15 compresses only the Y data denoted by ⊙. The compressed image data is written in the memory card 16 at step S106.

At step S107, the separator 14 reads the rest of the Y data (denoted by notation ○) from the image memory 13 and inputs it to the data compression circuit 15.

At step S108, only the Y image data denoted by notation ○ is compressed by the data compression circuit 15, and the compressed image data is written in the memory card 16 at step S109, and the processing ends.

The details of the operation of the data compression circuit 15 at steps S105 and S108 of FIG. 2 is now described.

Figure 4:
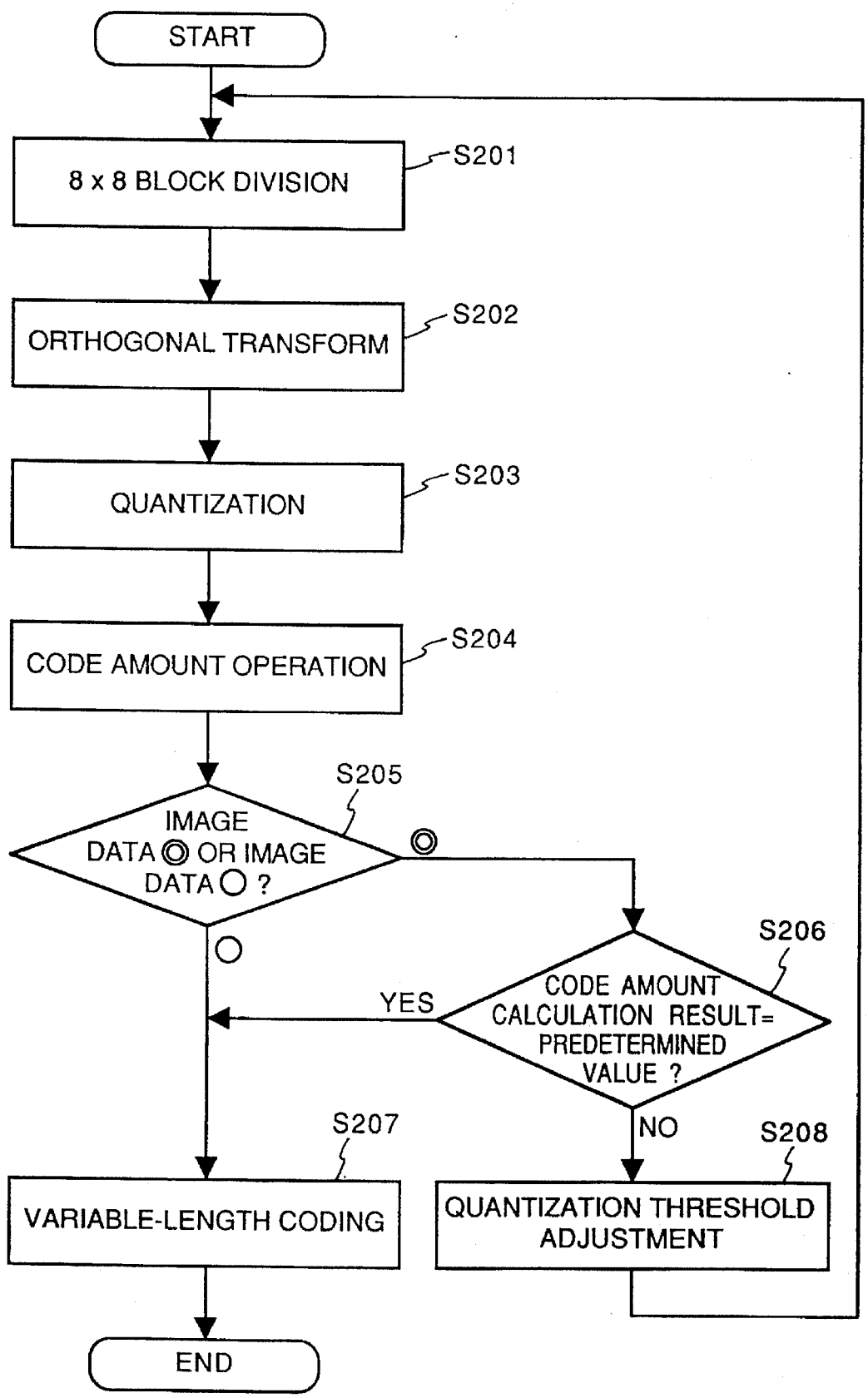
FIG. 4 is a flowchart illustrating the operation of the image data compression operation in a data compressing circuit of the present invention.

FIG. 4 is a flowchart illustrating an image data compression operation of the data compression circuit 15. Processes shown in FIG. 4 are executed by the CPU (not shown) in the data compression circuit 15 in accordance with a program stored in a ROM (not shown).

In FIG. 4, the data compression circuit 15 divides the input Y image data into 8×8 blocks at step S201. An orthogonal transform is performed on each block at step S202. In the present embodiment, a discrete cosine transform (DCT) is used as an example of the orthogonal transform.

Successively, at step S203, the data compression circuit 15 quantizes coefficients obtained by the orthogonal transform at the previous step. Meantime, a quantization threshold $T_i$ (i=1, 2, . . . , 64) is set for each of 64 orthogonal transform coefficients in the blocks.

At step S204, calculated is a data amount of encoded codes which are obtained by tentatively subjecting a variable-length encoding to the coefficients.

The data compression circuit 15 has a function to adjust the amount of codes to a predetermined value. For that purpose, the compression circuit 15 judges whether the data amount of the encoded coder equals the predetermined value. If a match is not made, the data compression circuit 15 alters the threshold $T_i$ by multiplying $T_i$ by a coefficient K.

$T_j = K \times T_i$ wherein i=1, 2, 3, ..., 64.

As aforementioned, the data compression circuit 15 compresses the ⊙ Y data and ○ Y data at steps S105 (FIG. 4) and S108, separately. Accordingly, at step S205, the data compression circuit 15 judges whether the image data to be compressed is Y data denoted by ⊙ or ○. If the image data which is being compressed is the Y data denoted by ⊙, the process proceeds to step S206. On the other hand, if the image data being compressed is Y data denoted by ○, the process proceeds to step S207.

In the case of data compression for Y data denoted by ⊙, the data compression circuit 15 compares the coding amount (entire data amount of encoded codes obtained by the tentative encoding) with the predetermined value at step S206. If they match, the process proceeds to step S207, while if they don't match, the process proceeds to step S208 where the quantization threshold $T_i$ is adjusted by modifying the coefficient K, and the process returns to step S201. That is, in the case of data compression for Y data denoted by ⊙, the data compression circuit 15 adjusts the quantization threshold $T_i$ at step S208 until the coding amount and the predetermined value are matched by repeating the operation from step S201 to S206. The coefficient K is selected so that the code amount may be decreased in a monotone manner and that the code amount is converged to the predetermined value by changing the quantization threshold $T_i$ several times.

In the case of data compression for Y data denoted by ⊙ and the case where the code amount and predetermined value are matched, the data compression circuit 15 actually encodes the quantized data by the variable-length coding at step S207 and ends the processing operation.

Figure 8B:
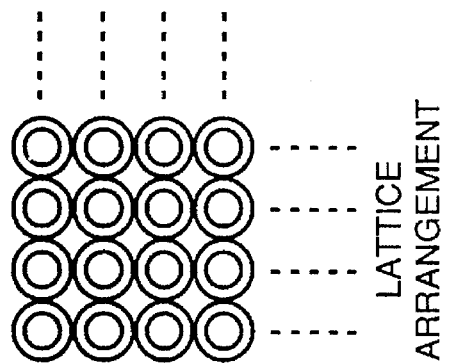
FIGS. 8A to 8C illustrate a data separation operation according to the invention.
Figure 8C:
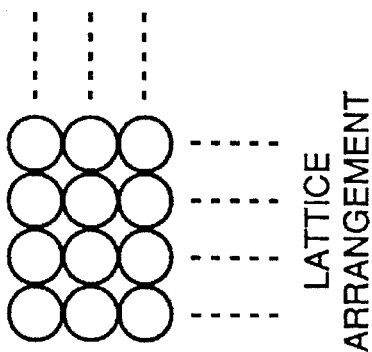
Figure 8A:
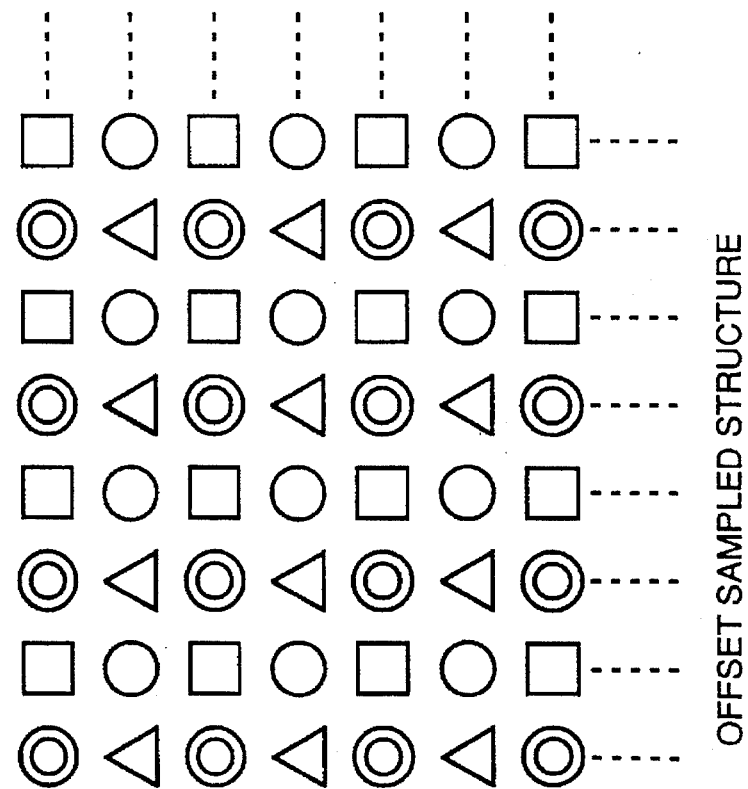

According to the above described apparatus, the Y data denoted by ⊙ are compacted into a consecutive arrangement of ⊙ Y data as shown in FIG. 8B by step S105. Similarly, Y data by ○ are consecutively arranged as shown in FIG. 8C by step S208. In this regard, FIG. 8A illustrates the original data. Since all the Y data are arranged consecutively, the encoding operations at step S207 give an efficient data compression. Such arrangement of pixels are referred to as a "lattice arrangement".

Furthermore, at step S208, the adjustment operation of quantization threshold $T_i$ is omitted. More particularly, in the data compression operation for Y data denoted by ○, step S208 is skipped. This skip is allowed because the Y data denoted by ⊙ and Y data denoted by ○ have similarities in statistical characteristics. Therefore, the quantization threshold $T_i$ for ○ Y data is set to the same value as that for the Y data denoted by ⊙. Accordingly, the process can directly proceed to step S207 without adjusting the quantization threshold T when the Y data of the notation ○ is compressed.

Modifications of the above embodiment will be described below. In the above description and diagrams, the compression of Y data with "offset sampled structure" is illustrated as an example of the application of the present invention. However, this does not impose a limitation upon the invention. For example, it is applied to compression of color data other than Y data.

Still further, in the above description, the DCT is used as an orthogonal transform. However, this does not impose a limitation upon the invention. For example, a Hadamard transform can be used.

Still further, the CCD area sensor can be a sensor of complimentary-color type rather than the Bayer type arrangement. It can be replaced by any sensor capable of generating image data of an "offset sampled structure". For Example, a plurality of area sensor can be used for reading one color component.

According to the present embodiment, the image data of the "offset sampled structure" is separated into two image planes and the data of each plane is compressed by the ADCT method. Accordingly, the image processing method and apparatus of the present embodiment can reduce the time required for compression processing to less than half the time required by the conventional method and apparatus because the present method has eliminated the interpolation process.

Furthermore, according to the present invention, in a case where an amount of the compressed data should be fixed, the fact that the ⊙ Y data and ○ Y data have similarities in statistical characteristics can be utilized, and therefore a quantization threshold $T_i$ is obtained for the ⊙ Y data can be utilized for a quantization operation of the ○ Y data. Accordingly, the time required for fixing the amount of encoded data is substantially decreased.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
    a generating step for generating image data by using a sensor which has a plurality of picture cells and color filters which are arranged as a predetermined array;
    a separating step for separating the image data generated in said generating step into a plurality of image components, each of the plurality of image components corresponding to each of said color filters;
    a setting step for setting quantization parameters suitable for obtaining an objective coding amount, in accordance with a predetermined image component separated in said separating step;
    a first coding step for coding the predetermined image component in accordance with the quantization parameters set in said setting step; and
    a second coding step for coding another image component separated in said separating step in accordance with the quantization parameters set in said setting step.

2. The image processing method according to claim 1, wherein said first coding step includes:
    a dividing step for dividing the image data into a plurality of blocks;
    a transform step for performing an orthogonal transform on said plurality of blocks of image data; and
    a quantizing step for quantizing orthogonal transform coefficients obtained in said transform step with the quantization parameters.

3. The image processing method according to claim 2, wherein said transform step is performed by using a discrete cosine transform.

4. The image processing method according to claim 2, wherein said second coding step includes:
    a dividing step for dividing the image data into a plurality of blocks;
    a transform step for performing an orthogonal transform on said plurality of blocks of image data; and
    a quantizing step for quantizing orthogonal transform coefficients obtained in said transform step with the quantization parameters.

5. The image processing method according to claim 4, wherein said transform step of said second coding step is performed by using a discrete cosine transform.

6. The image processing method according to claim 1, wherein said sensor is of the Bayer type arrangement.

7. The image processing method according to claim 1, wherein the plurality of image components comprise a plurality of pixels each having high correlation with each other.

8. An image processing apparatus comprising:

a sensor for generating image data, said sensor having a plurality of picture cells and color filters which are arranged as a predetermined array;

separating means for separating the image data generated by said sensor into a plurality of image components, each of the plurality of image components corresponding to each of said color filters;

setting means for setting quantization parameters suitable for obtaining an objective coding amount, in accordance with a predetermined image component separated by said separating means;

first coding means for coding the predetermined image component in accordance with the quantization parameters set by said setting means; and second coding means for coding another image component separated by said separating means in accordance with the quantization parameters set by said setting means.

9. The image processing apparatus according to claim 8, wherein said first coding means includes:

dividing means for dividing the image data into a plurality of blocks;

transform means for performing an orthogonal transform on said plurality of blocks of image data; and quantizing means for quantizing orthogonal transform coefficients obtained by said transform means with the quantization parameters.

10. The image processing apparatus according to claim 9, wherein said transform means performs a discrete cosine transform.

11. The image processing apparatus according to claim 8, wherein said second coding means includes:

dividing means for dividing the image data into a plurality of blocks;

transform means for performing an orthogonal transform on said plurality of blocks of image data; and quantizing means for quantizing orthogonal transform coefficients obtained by said transform means with said quantization parameters.

12. The image processing apparatus according to claim 11, wherein said transform means of said second coding means performs a discrete cosine transform.

13. The image processing apparatus according to claim 8, wherein said sensor is of the Bayer type arrangement.

14. The image processing apparatus according to claim 8, wherein the image data coded by said first coding means and second coding means is stored into a memory card.

15. The image processing apparatus according to claim 8, wherein the plurality of image components comprise a plurality of pixels each having high correlation with each other.

* * * * *

UNITED STATES PATENT AND TRADEMARK OFFICE
CERTIFICATE OF CORRECTION

PATENT NO. : 5,627,916

DATED : May 6, 1997

INVENTOR(S): IZURU HORIUCHI

It is certified that error appears in the above-identified patent and that said Letters Patent is hereby corrected as shown below:

COLUMN 1
  Line 15, "processing, and apparatus" should read
    --processing apparatus, and--;
  Line 25, "and" should read --to--.

COLUMN 2
  Line 64, "504," should read --504--.

COLUMN 4
  Line 3, "as" should read --as a--.

COLUMN 5
  Line 29, "◎" should read --O--.

Signed and Sealed this

Twenty-first Day of October 1997

*Attest:*

BRUCE LEHMAN

*Attesting Officer*     Commissioner of Patents and Trademarks